(12) United States Patent
Takehara et al.

(10) Patent No.: US 7,708,102 B2
(45) Date of Patent: May 4, 2010

(54) COLLISION DETECTING SYSTEM

(75) Inventors: Satoru Takehara, Obu (JP); Shingo Wanami, Kariya (JP); Toshihito Nonaka, Chiryu (JP); Yu Obara, Toyoake (JP)

(73) Assignee: Denso Corporation, Kariya (JP)

( * ) Notice: Subject to any disclaimer, the term of this patent is extended or adjusted under 35 U.S.C. 154(b) by 788 days.

(21) Appl. No.: 11/515,958

(22) Filed: Sep. 5, 2006

(65) Prior Publication Data

US 2007/0051599 A1    Mar. 8, 2007

(30) Foreign Application Priority Data

Sep. 5, 2005    (JP)    ............................. 2005-256755

(51) Int. Cl.
    *B60K 28/10*    (2006.01)
(52) U.S. Cl. ..................................... 180/274
(58) Field of Classification Search ................ 180/274, 180/271; 280/735; 701/45
    See application file for complete search history.

(56) References Cited

U.S. PATENT DOCUMENTS

| 5,748,075 | A  | 5/1998 | Dirmeyer et al. |
| 6,536,259 | B2 | 3/2003 | Mattes |
| 6,781,511 | B2 | 8/2004 | Ota |
| 6,798,340 | B2 | 9/2004 | Ota |

FOREIGN PATENT DOCUMENTS

| DE | 43 22 488 A1 | 5/1994 |
| DE | 101 06 311 A1 | 8/2002 |
| DE | 103 09 713 A1 | 9/2004 |
| DE | 103 17 638 | 11/2004 |
| DE | 10 2004 035 738 | 9/2005 |
| GB | 2 307 750 A | 6/1997 |
| JP | 02-249740 | 10/1990 |
| JP | 08-324379 | 12/1996 |
| WO | 2004/078530 | 9/2004 |

OTHER PUBLICATIONS

Office Action dated Mar. 26, 2007 in German Application No. 10 2006 040 216.2 with English translation.
Office Action dated Mar. 26, 2007 issued in German Patent Application No. 102006040666.4 (with translation), which is the same technical field as the present application.

*Primary Examiner*—Faye M. Fleming
(74) *Attorney, Agent, or Firm*—Harness, Dickey & Pierce, PLC

(57) ABSTRACT

A collision detecting system for a vehicle has a pressure detecting member for detecting a pressure in a substantially closed space which is arranged at a periphery portion of the vehicle, and a vibration detecting member for detecting a vibration of the vehicle. The pressure in the space is calculated for a detection of a vehicle collision, based on pressure signals detected by the pressure detecting member and vibration signals detected by the vibration detecting member. Therefore, the influence of the vehicle vibration on the detection of the pressure in the space can be restricted, thus improving the detection of the vehicle collision.

15 Claims, 4 Drawing Sheets

COLLISION DETECTING SYSTEM

CROSS REFERENCE TO RELATED APPLICATION

This application is based on a Japanese Patent Application No. 2005-256755 filed on Sep. 5, 2005, the disclosure of which is incorporated herein by reference.

FIELD OF THE INVENTION

The present invention relates to a collision detecting system which detects a collision with an improved accuracy with respect to an influence of a vibration.

BACKGROUND OF THE INVENTION

Generally, a vehicle is provided with a passenger protecting system for protecting passengers in a collision of the vehicle. The passenger protecting system has, for example, an airbag device for deploying an airbag to protect the head portion or the like of the passenger, and/or a pre-tensioner device for taking up a slack of a seat belt of the vehicle.

The airbag device and the pre-tensioner device are controlled by a control unit such as an ECU. The ECU performs a determination of a vehicle collision based on signals from sensors mounted to the vehicle, and actuates the airbag device and the pre-tensioner device when the vehicle collision is determined.

For example, the sensor for detecting the vehicle collision can be constructed of an acceleration sensor for detecting an acceleration variation of the vehicle, a touch sensor which is attached to a periphery portion of the vehicle to detect a stress thereat, a pressure sensor for detecting a pressure variation in a space formed at the periphery portion of the vehicle, or the like.

It is desirable for the passenger protecting system to protect the passenger not only from a vehicle collision in the vehicle traveling direction (i.e., vehicle front-rear direction), but also from a side collision of the vehicle which causes a vehicle-width-direction impact on the vehicle.

For example, as disclosed in JP-2-249740A, the airbag device for protecting the passenger from the side collision of the vehicle is provided with a side airbag, which can be deployed according to detection signals of the pressure sensor. The pressure sensor detects the variation of an inner pressure of the vehicle door.

However, in this case, because the pressure sensor is mounted to the vehicle door to detect the inner pressure thereof, the vibration information of the vehicle which is excited by the impact load of the collision will be included in the detection signals of the pressure sensor. Specifically, when the vehicle collision occurs, the impact load due to the collision is transmitted to the vehicle body such as the vehicle door. As a result, the vehicle door is excited to vibrate, and the vibration will be transferred to the pressure sensor. According to the conventional side-airbag system, the vibration of the vehicle door is added to the inner pressure thereof to be detected by the pressure sensor, thus causing an error in the collision determination which is performed based on the detection signals of the pressure sensor.

Although the error can be reduced by a correction of the detection signals of the pressure sensor by the ECU, the responsivity is inferior and processing time is needed, which is undesirable.

SUMMARY OF THE INVENTION

In view of the above-described disadvantages, it is an object of the present invention to provide a collision detecting system in which an error in detecting a collision is reduced.

According to the present invention, a collision detecting system for a vehicle has a pressure detecting member for detecting a pressure in a substantially closed space which is arranged at a periphery portion of the vehicle, and a vibration detecting member for detecting a vibration of the vehicle. The pressure in the space is calculated for a detection of a collision of the vehicle, based on pressure signals detected by the pressure detecting member and vibration signals detected by the vibration detecting member.

Thus, the vehicle vibration can be restricted from influencing the detection of the pressure in the space of the vehicle. Accordingly, the detection of the vehicle collision based on the pressure variation in the space can be improved.

Preferably, the pressure detecting member and the vibration detecting member are positioned in contact with each other.

That is, the vibration detecting member and the pressure detecting member can be arranged adjacently to each other. Thus, the vibration transferred to the pressure detecting member from the vehicle can be properly detected by the vibration detecting member. Thus, the detection of the vehicle collision can be further improved.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLE EMBODIMENTS

First Embodiment

A collision detecting system according to a first embodiment of the present invention will be described with reference to FIGS. 1-3. The collision detecting system can be suitably used for a vehicle, for example.

Figure 1A:
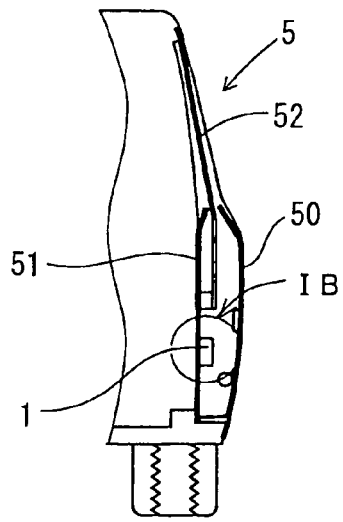
FIG. 1A is a schematic view showing a collision detecting system which is mounted to a vehicle according to a first embodiment of the present invention.
Figure 1B:
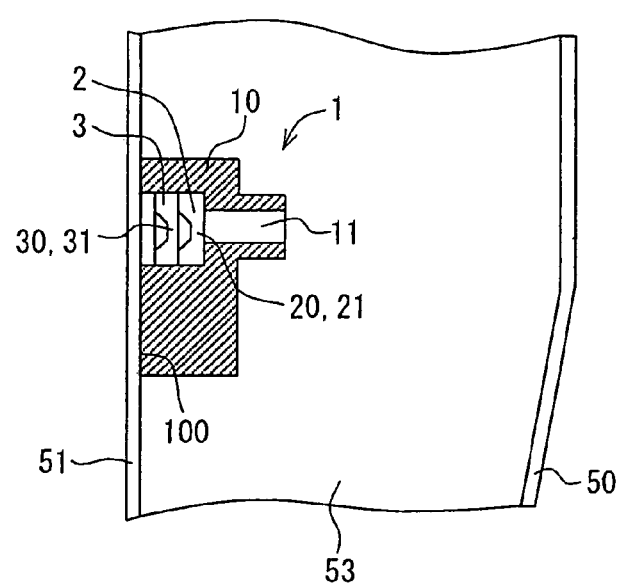
FIG. 1B is an enlarged partially-sectional view showing a part IB in FIG. 1A.

The collision detecting system is provided with an inner-pressure detecting device 1 for measuring a pressure in a substantially closed space 53 which is arranged at a periphery portion (e.g., door 5) of the vehicle. As shown in FIGS. 1A and 1B, the door 5 of the vehicle has an outer panel 50, an inner panel 51 and a window glass 52 which is interposed between the outer panel 50 and the inner panel 51. The outer panel 50 constructs a part of an exterior member of the vehicle. The inner panel 51 constructs a part of an interior member of the vehicle. That is, the inner panel 51 is positioned at the side of a passenger compartment of the vehicle.

The door 5 has therein the substantially closed space 53 between the outer panel 50 and the inner panel 51. The space 53 is in small communication (fluid communication) with the exterior of the door 5. When the pressure (air pressure) of the exterior of the door 5 varies, the pressure (air pressure) in the space 53 of the interior of the door 5 also varies. The space 53 is formed in such a manner that the pressure in the space 53 (i.e., inner pressure of door 5) will increase when the capacity (i.e., volume) of the space 53 sharply varies.

As shown in FIGS. 1A and 1B, the inner-pressure detecting device 1 of the collision detecting system includes a pressure detecting member 2 (e.g., pressure sensor) and a vibration detecting member 3 (e.g., vibration sensor). The inner-pressure detecting device 1 can be attached to the inner panel 51 of the door 5, with a vehicle mounting side 100 of the inner-pressure detecting device 1 contacting the space-side surface (i.e., surface of the side of space 53) of the inner panel 51.

The pressure sensor 2 can be a diaphragm-typed pressure sensor, for example. In this case, the pressure sensor 2 includes a sensing unit 20 (first sensing unit) having a thin-walled portion 21 (e.g., diaphragm), and a circuit 22 for measuring a resistance of the thin-walled portion 21.

When the diaphragm 21 is deformed in the thickness direction thereof, a compression stress and a tensile stress will occur respectively at a center portion and a periphery portion of the diaphragm 21. Thus, the resistance of the diaphragm 21 varies. For example, when a pressure (and/or vibration) in the thickness direction of the diaphragm 21 is applied to the diaphragm 21, the diaphragm 21 is deformed in the thickness direction. As a result, the resistance of the diaphragm 21 is changed. The pressure exerted to the diaphragm 21 can be detected based on the deformation amount thereof, which is calculated according to the variation of the resistance. In this case, the thickness direction of the diaphragm 21 corresponds to the detection direction of the diaphragm 21 (i.e., detection direction of pressure sensor 2).

The vibration sensor 3 can be provided with the same construction as the pressure sensor 2. For example, the vibration sensor 3 can be a diaphragm-typed pressure sensor which is the same with the pressure sensor 2. That is, the vibration sensor 3 includes a sensing unit 30 (second sensing unit) having a thin-walled portion 31 (e.g., diaphragm), and a circuit 32 for measuring a resistance of the diaphragm 31.

Similarly, when the diaphragm 31 is deformed in the thickness direction thereof, a compression stress and a tensile stress will occur respectively at a center portion and a periphery portion of the diaphragm 31. Thus, the resistance of the diaphragm 31 varies. For example, when a vibration (and/or pressure) in the thickness direction of the diaphragm 31 is transferred to the diaphragm 31, the diaphragm 31 will vibrate to be deformed in the thickness direction. As a result, the resistance of the diaphragm 31 is changed. The vibration exerted to the diaphragm 31 can be detected based on the deformation amount thereof, which is calculated according to the variation of the resistance thereof. In this case, the thickness direction of the diaphragm 31 corresponds to the detection direction of the diaphragm 31 (i.e., detection direction of vibration sensor 3).

In this case, the detection surface of the diaphragm 21 can be provided with a substantially same area as that of the diaphragm 31. The detection surface of the diaphragm 21, 31 is a surface perpendicular to the detection direction (thickness direction) of the diaphragm 21, 31.

Figure 2:
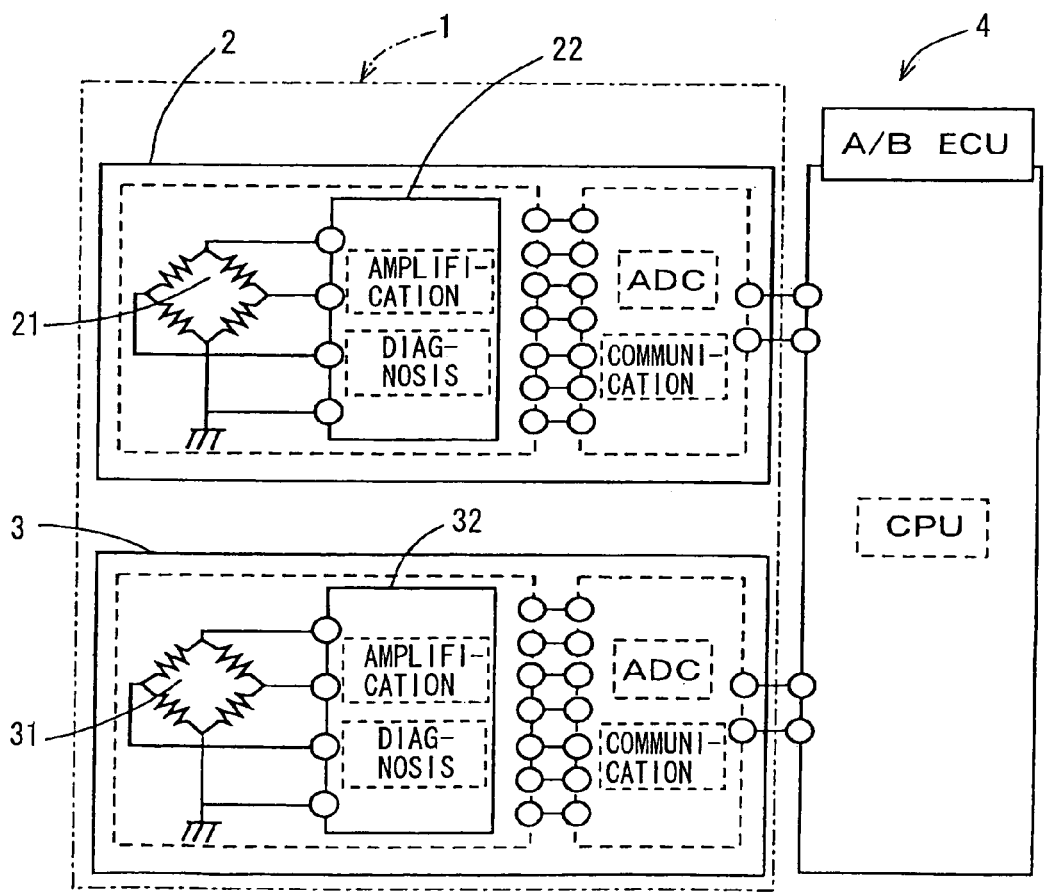
FIG. 2 is a schematic diagram showing circuit components of an inner-pressure detecting device according to the first embodiment.

As shown in FIG. 2, the pressure sensor 2 has the circuit 22 for detecting the resistance variation of the diaphragm 21. Similarly, the vibration sensor 3 has the circuit 32 for detecting the resistance variation of the diaphragm 31. The circuits 22 and 32 can respectively process (e.g., amplify and A/D convert) signals outputted from the pressure sensor 2 and the vibration sensor 3, and respectively fault-diagnose the pressure sensor 2 and the vibration sensor 3. The sensor 2, 3 can also have circuit components such as a communication unit and the like.

The collision detecting system further has a calculating unit 4, into which the pressure signals from the pressure sensor 2 and the vibration signals from the vibration sensor 3 are inputted. In this case, the calculating unit 4 calculates the pressure in the space 53 of the interior of the door 5, based on the inputted pressure signals and the vibration signals. The calculating unit 4 is constructed of, for example, an ECU which can be integrated with the inner-pressure detecting device 1.

Referring to FIGS. 1A and 1B, the inner-pressure detecting device 1 can be attached to the inner panel 51 of the door 5, at the vehicle mounting side 100 of the inner-pressure detecting device 1. In this case, the first sensing unit 20 of the pressure sensor 2 is stacked upon the second sensing unit 30 of the vibration sensor 3 with respect to the inner panel 51, and the thickness direction (detection direction) of the diaphragm 21 is arranged to substantially coincide with that of the diaphragm 31. That is, the first sensing unit 20 and the second sensing unit 30 are stacked in the thickness direction of the diaphragm 21, 31. The first sensing unit 20 is positioned at the side of a communication aperture 11 of the inner-pressure detecting device 1, and the second sensing unit 30 is positioned at the vehicle mounting side 100 of the inner-pressure detecting device 1.

The inner-pressure detecting device 1 has a case member 10 which is provided with the communication aperture 11 for communicating the interior and the exterior of the case member 10. The pressure sensor 2 is mounted in case member 10, in such a manner that the diaphragm 21 is exposed to the space 53 through the communication aperture 11.

Two extension-direction ends of the communication aperture 11 are respectively provided with openings. The opening of the one end of the communication aperture 11 is adjacent to the diaphragm 21 and the opening of the other end thereof is formed at the side surface of the case member 10. That is, the opening of the other end of the communication aperture 11 is arranged at an opposite side of the case member 10, to the vehicle mounting side 100 of the inner-pressure detecting device 1 (communication aperture 11). Thus, the pressure in the space 53 can be applied to the diaphragm 21 through the communication aperture 11.

In this case, the two opposite surfaces of the first sensing unit 20 respectively face the opening of the one end of the communication aperture 11 and the second sensing unit 30. The second sensing unit 30 contacts the surface (which faces second sensing unit 30) of the first sensing unit 20, to be sealed by the case member 10 and the first sensing unit 20. That is, the second sensing unit 30 of the vibration sensor 3 is isolated from the space 53.

Next, the detection of a collision of the vehicle via the collision detecting system will be described.

For example, when there occurs a side collision between an obstacle and the door 5 of the vehicle, the obstacle contacts the outer panel 50 of the door 2 and presses the outer panel 50 toward the inner side of the vehicle. Thus, the outer panel 50 is deformed to move at least partially toward the side of the inner panel 51. Because the impact due to the collision is not directly applied to the inner panel 51, the shape of the inner panel 51 can be substantially maintained.

Therefore, in the case where the outer panel 50 is deformed due to the collision, the capacity of the space 53 of the interior of the door 5 will be sharply reduced. The amount of the fluid communication between the space 53 and the exterior of the door 5 is relatively small, and as such, the pressure in the space 53 increases. The pressure in the space 53 is detected by the pressure sensor 2.

The impact load due to the collision of the vehicle will be transferred toward the whole vehicle from the door 5. The inner panel 51 and the outer panel 50 of the door 5 are excited by the impact load to vibrate. The vibration of the inner panel 51 is detected via the vibration sensor 3 of the inner-pressure detecting device 1 which is attached to the inner panel 51. In this case, the vibration of the inner panel 51 is also included in the detection signal of the pressure sensor 2.

According to this embodiment, the pressure signals detected by the pressure sensor 2 and the vibration signals detected by the vibration sensor 3 are sent to the calculating unit 4, so that the pressure in the space 53 is calculated based on the pressure signals and the vibration signals.

Specifically, the vibration of the inner panel 51 due to the impact load excites the diaphragm 21 of the pressure sensor 2. As a result, the diaphragm 21 vibrates. Therefore, the pressure sensor 2 will detect not only the pressure (i.e., inner pressure of space 53) applied to the diaphragm 21 but also the vibration of the diaphragm 21 which is excited by the vibration of the inner panel 51. That is, in this case, the deformation of the diaphragm 21 is caused by not only the pressure in the space 53 but also the vibration transferred thereto from the inner panel 51.

According to this embodiment, the vibration of the inner panel 51 is detected by the vibration sensor 3. In the calculation of the pressure in the space 53 via the calculating unit 4, the detection result (vibration signals) of the vibration sensor 3 will be subtracted from the detection result (pressure signals) of the pressure sensor 2.

As described above, the pressure sensor 2 has the construction which is the same with the vibration sensor 3. Moreover, the inner-pressure detecting device 1 is mounted to the inner panel 51, in such a manner that the first sensing unit 20 is stacked upon the second sensing unit 30 with respect to the inner panel 51 and the detection directions thereof substantially coincide with each other. That is, the pressure sensor 2 and the vibration sensor 3 are provided with the substantially same detection method and the substantially same detection property.

Thus, the vibration of the inner panel 51 which is detected by the second sensing unit 30 substantially corresponds to the vibration which is transferred to the first sensing unit 20 from the inner panel 51 and is detected by the first sensing unit 20.

Figure 3:
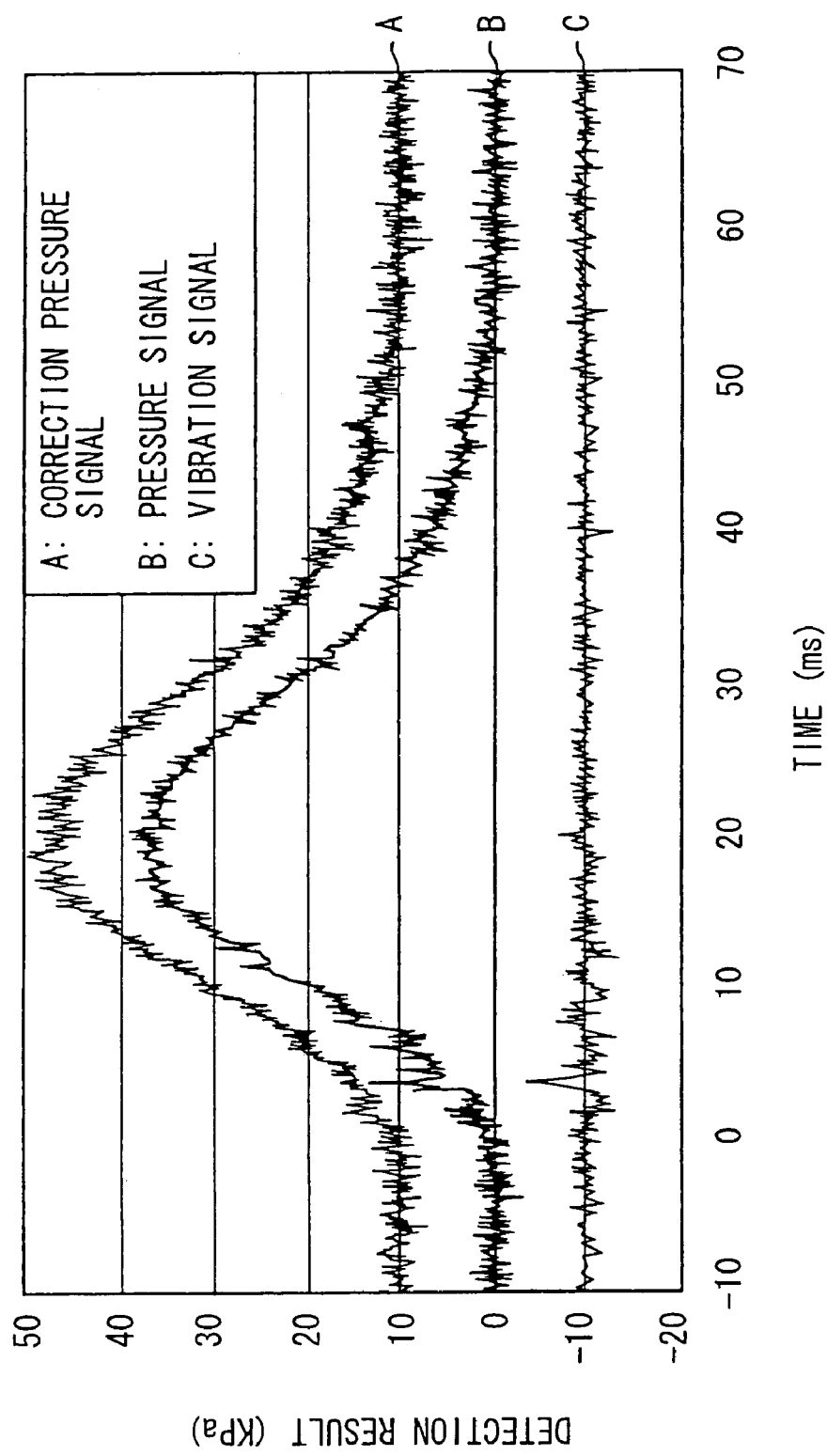
FIG. 3 is a graph showing a detection result of a side collision via the inner-pressure detecting device according to the first embodiment.

FIG. 3 shows the pressure signals detected by the pressure sensor 2, the vibration signals detected by the vibration sensor 3, and the correction pressure signals of the pressure in the space 53 which are acquired via the calculating unit 4 by a subtraction of the vibration signals from the pressure signals. Referring to FIG. 3, the influence of the vehicle vibration on the detection of the pressure in the space 53 can be greatly restricted, by correcting the pressure signals of the pressure sensor 2 via the vibration signals of the vibration sensor 3.

Thus, the pressure in the space 53 can be properly detected. Therefore, the vehicle collision can be determined with a higher accuracy, based on the pressure in the space 53 which is detected via the inner-pressure detecting device 1.

According to this embodiment, the pressure of the space 53 can be measured by a simple correction (i.e., subtraction of vibration signals from pressure signals), thus improving the responsivity in the calculation of the pressure in the space 53.

The collision detecting system can be suitably used for a passenger protecting device having an airbag (e.g., side airbag) or the like, which will be deployed to protect passengers from the vehicle collision. In this case, the signal of the pressure in the space 53 which is calculated by the calculating unit 4 can be sent to an airbag ECU (A/B ECU). The airbag ECU having a CPU controls the deployment of the side airbag according to the pressure signal, to protect the passenger from the side collision of the vehicle. According to this embodiment, the detection accuracy of the vehicle collision can be improved, thus reducing the malfunction of the passenger protecting device.

Next, a first modification of the first embodiment will be described.

Figure 4:
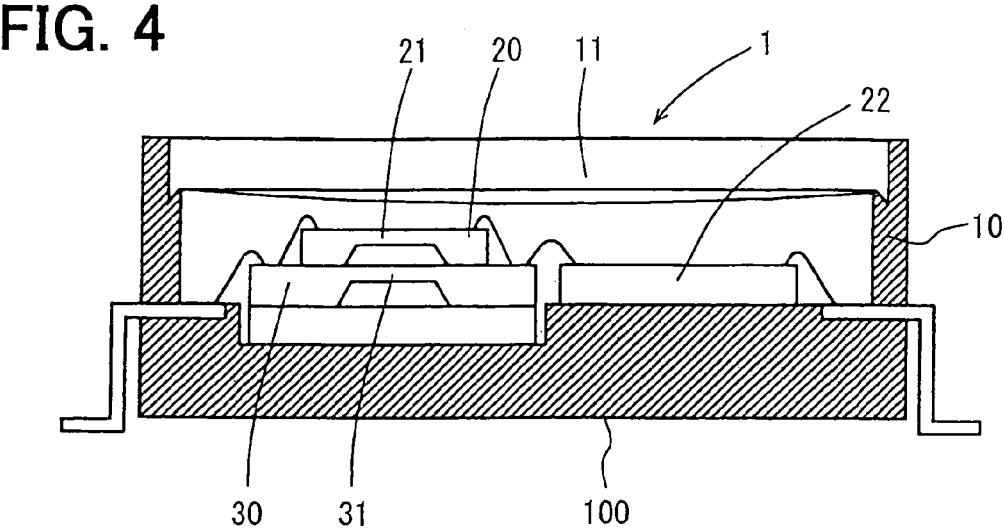
FIG. 4 is a schematic partially-sectional view showing a construction of an inner-pressure detecting device according to a first modification of the first embodiment.

As shown in FIG. 4, the detection surface of the diaphragm 31 has a larger area than that of the diaphragm 21. The first sensing unit 20 of the pressure sensor 2 is stacked upon the second sensing unit 30 of the vibration sensor 3 with respect to the vehicle mounting side 100 of the inner-pressure detecting device 1. That is, the first sensing unit 20 is arranged at the side of the communication aperture 11, and the second sensing unit 30 is positioned at the vehicle mounting side 100 of the inner-pressure detecting device 1.

In this case, a part of the second sensing unit 30 is directly covered by the first sensing unit 20 to be isolated from the space 53, which is communicated with the communication aperture 11. The second sensing unit 30 other than the part thereof contacting (being directly covered by) the first sensing unit 20 can be sealed by a resin member (not shown) or the like to be isolated from the space 53. In this case, the circuits for detecting the resistance variations of the diaphragms 21 and 31 of the pressure sensor 2 and the vibration sensor 3 can be constructed of the single circuit 22 (or 32).

Alternatively, the second sensing unit 30 of the vibration sensor 3 can be also arranged without directly contacting the first sensing unit 20 of the pressure sensor 2, that is, without being directly covered by the first sensing unit 20. In this case, the second sensing unit 30 is sealed by the resin member (not shown) or the like, and the first sensing unit 20 is stacked upon the second sensing unit 30 (sealed by resin member) with respect to the vehicle mounting side 100 of the inner-pressure detecting device 1. That is, the second sensing unit 30 is isolated from the space 53 by the resin member.

Similar to the first embodiment, the vehicle collision can be also detected via the inner-pressure detecting device 1 according to the first modification.

Next, a second modification of the first embodiment will be described.

Figure 5:
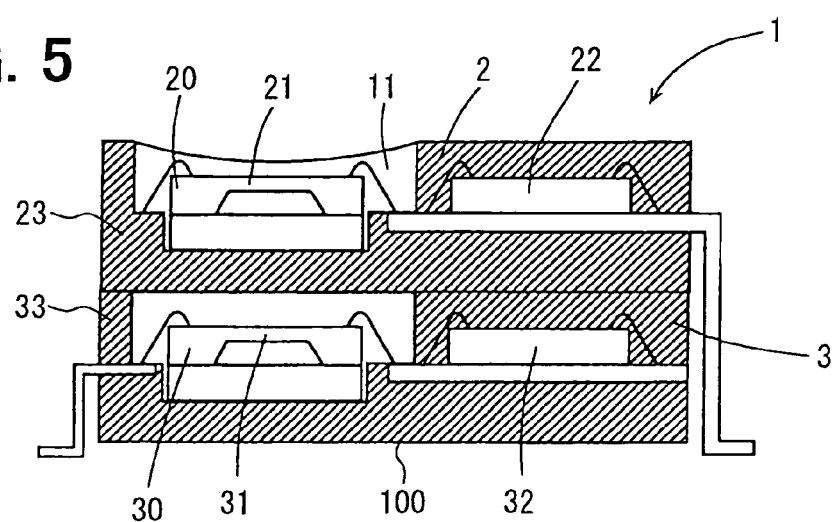
FIG. 5 is a schematic partially-sectional view showing a construction of an inner-pressure detecting device according to a second modification of the first embodiment.

In this case, as shown in FIG. 5, the pressure sensor 2 and the vibration sensor 3 of the inner-pressure detecting device 1 are respectively provided with housings 23 and 33. The first sensing unit 20 and the circuit 22 of the pressure sensor 2 are accommodated in the housing 23, and the second sensing unit 30 and the circuit 32 of the vibration sensor 3 are accommodated in the housing 33. The housing 23 is stacked upon the housing 33 with respect to the vehicle mounting side 100 of the inner-pressure detecting device 1. Thus, the second sensing unit 30 is sealed by the housing 23 and the housing 33, to be isolated from the space 53 which is communicated with the communication aperture 11. In this case, the first sensing unit 20 and the second sensing unit 30 can be mounted in such a manner that the detection directions thereof substantially coincide with each other.

Similar to the first embodiment, the vehicle collision can be also detected via the inner-pressure detecting device 1 according to the second modification.

Second Embodiment

A collision detecting system according to a second embodiment of the present invention will be described with reference to FIGS. 6A-7. The collision detecting system has the inner-pressure detecting device 1 for detecting the pressure in the space 53 of the interior of the door 5 of the vehicle. The inner-pressure detecting device 1 is provided with the pressure sensor 2, the vibration sensor 3 and the calculating unit 4.

Figure 6A:
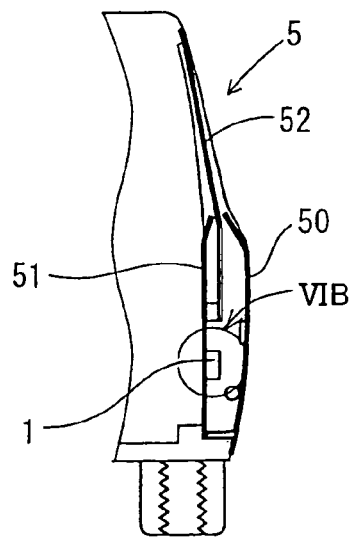
FIG. 6A is a schematic view showing a collision detecting system which is mounted to a vehicle according to a second embodiment of the present invention.
Figure 6B:
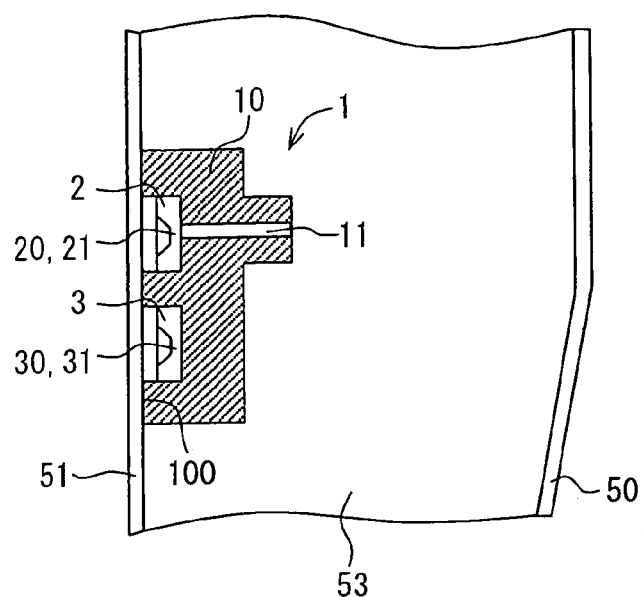
FIG. 6B is an enlarged partially-sectional view showing a part VIB in FIG. 6A.

Referring to FIGS. 6A and 6B, the inner-pressure detecting device 1 is provided with the case member 10 for housing the pressure sensor 2 and the vibration sensor 3. Each of the pressure sensor 2 and the vibration sensor 3 can be constructed of the diaphragm-typed pressure sensor and has the same construction. In this case, the inner-pressure detecting device 1 is mounted to the inner panel 51, in such a manner that the pressure sensor 2 and the vibration sensor 3 are arranged in a line with respect to the detection direction thereof. The detection directions of the pressure sensor 2 and the vibration sensor 3 can be parallel to each other.

The case member 10 is provided with the communication aperture 11 for communicating the interior of the case member 10 with the exterior thereof. The two ends of the communication aperture 11 are respectively provided with the openings. The opening of the one end of the communication aperture 11 is arrange to be adjacent to the diaphragm 21 of the pressure sensor 2, and the opening of the other end of the communication aperture 11 is formed at the side surface of the case member 10. Thus, the diaphragm 21 is communicated with the space 53 through the communication aperture 11. That is, the diaphragm 21 is exposed to the space 53.

The vibration sensor 3 is closed in the case member 10 to be isolated from the space 53, so that the pressure in the space 53 is not applied to the diaphragm 31 of the vibration sensor 3. Thus, the diaphragm 31 only detects the vibration of the inner-pressure detecting device 1, which is excited by the vibration of the inner panel 51.

Figure 7:
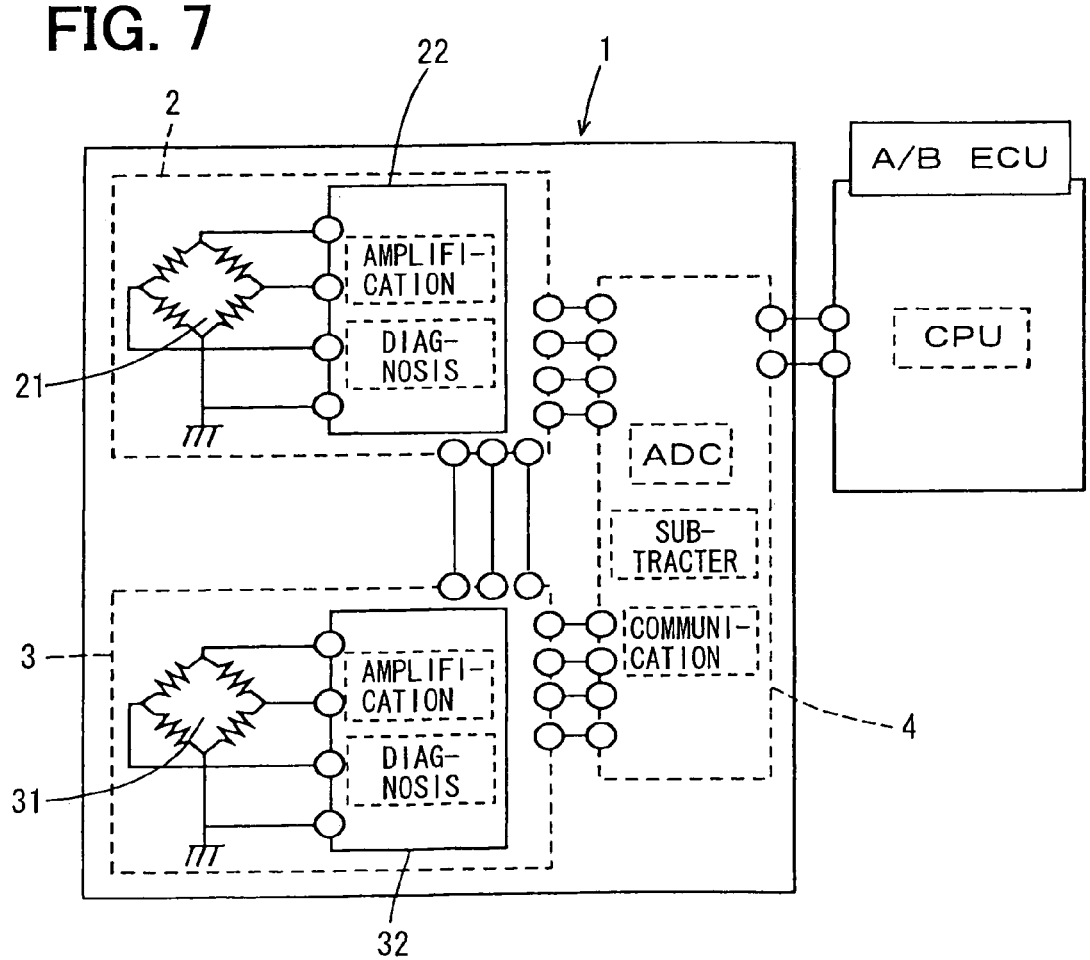
FIG. 7 is a diagram showing circuit components of an inner-pressure detecting device according to the second embodiment.

FIG. 7 shows the circuit components of the inner-pressure detecting device 1. Referring to FIG. 7, the pressure sensor 2 has the circuit 22 for detecting the resistance variation of the diaphragm 21, and the vibration sensor 3 has the circuit 32 for detecting the resistance variation of the diaphragm 31. The circuits 22 and 32 can respectively process (e.g., amplify and A/D convert) signals outputted from the pressure sensor 2 and the vibration sensor 3, and fault-diagnose the pressure sensor 2 and the vibration sensor 3.

The pressure signals from the pressure sensor 2 and vibration signals from the vibration sensor 3 are inputted into the calculating unit 4, which can be provided with a subtracter, an ADC, a communication unit and the like. The calculating unit 4 calculates the pressure in the space 53 of the door 5 based on the inputted pressure signals and the vibration signals. The calculating unit 4 can be integrated with the inner-pressure detecting device 1.

Referring to FIGS. 6A and 6B, the inner-pressure detecting device 1 is attached to the space-side surface (i.e., surface of the side of space 53) of the inner panel 51, in such a manner that the diaphragm 21 of the pressure sensor 2 is exposed to the space 53.

According to this embodiment, the vibration sensor 3 detects the vibration of the inner-pressure detecting device 1, which is also detected by the pressure sensor 2 provided to detect the pressure of the space 53 of the door 5. Referring to FIG. 3, in the calculation of the pressure in the space 53 by the calculating unit 4, the detection result (vibration signals) of the vibration sensor 3 will be subtracted from the detection result (pressure signals) of the pressure sensor 2. Thus, the pressure in the space 53 can be measured according to the correction pressure signals.

In this case, the pressure sensor 2 and the vibration sensor 3 are provided with the same construction, and arranged to have the detection directions parallel to each other. That is, the pressure sensor 2 and the vibration sensor 3 are provided with the substantially same detection property and detection method. Thus, the vibration transferred to the pressure sensor 2 can be substantially detected via the vibration sensor 3. Therefore, the influence of the vibration on the detection of the pressure in the space 53 of the door 5 can be restricted.

The collision detecting system can be suitably used for the passenger protecting device having the side airbag or the like, to detect the side collision of the vehicle or the like. In this case, the signal of the pressure in the space 53 which is calculated by the calculating unit 4 can be sent to the airbag ECU (A/B ECU). The airbag ECU having a CPU controls the deployment of the side airbag according to the pressure signal, to protect the passenger from the collision of the vehicle. According to this embodiment, the detection accuracy of the vehicle collision can be improved, thus reducing the malfunction of the passenger protecting device.

Next, a modification of the second embodiment will be described.

Figure 8:
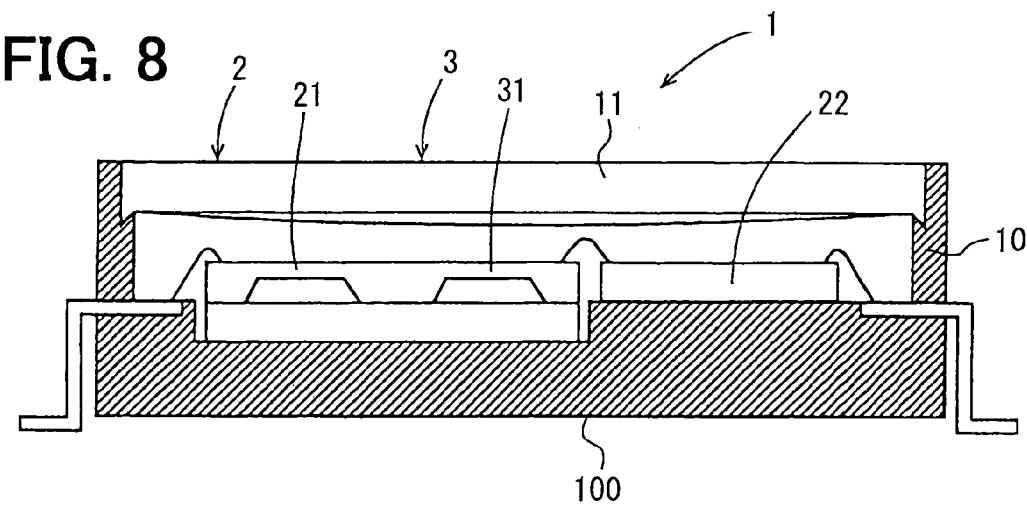
FIG. 8 is a schematic partially-sectional view showing a construction of an inner-pressure detecting device according to a modification of the second embodiment.

In this case, as shown in FIG. 8, the diaphragm 21 of the pressure sensor 2 and the diaphragm 31 of the vibration sensor 3 are arranged in a line with respect to the detection direction thereof, and integrated with each other in the arrangement direction thereof. That is, the detection surfaces of the diaphragms 21 and 31 are integrated with each other in the extension directions (perpendicular to thickness directions) thereof.

The diaphragm 21 is exposed to the space 53 through the communication aperture 11, while the diaphragm 31 is sealed by the resin member (not shown) or the like to be isolated from the space 53.

Similar to the second embodiment, the vehicle collision can be also detected via the inner-pressure detecting device 1 according to the modification. In this case, the diaphragm 21 of the pressure sensor 2 and the diaphragm 31 of the vibration sensor 3 are integrally formed. Thus, the circuits (for detecting resistance variations of diaphragms 21 and 31) of the pressure sensor 2 and the vibration sensor 3 can be constructed of the single circuit 22, for example. That is, the circuit 22 doubles as the circuit of the pressure sensor 2 and that of the vibration sensor 3. Thus, the inner-pressure detecting device 1 can be small-sized.

Other Embodiments

Although the present invention has been fully described in connection with the preferred embodiments thereof with reference to the accompanying drawings, it is to be noted that various changes and modifications will become apparent to those skilled in the art.

For example, the vibration sensor 3 of the inner-pressure detecting device 1 can be also constructed of a sensor other than the pressure sensor, for example, an acceleration sensor which has a detection property different from the pressure sensor 2. Thus, the detection accuracy can be improved.

According to the above-described embodiments, the pressure sensor 2 functions as a main sensor for the detection of the vehicle collision, and the vibration sensor 3 functions as a safetying sensor with respect to the pressure sensor 2 to restrict a false detection of the vehicle detection. However, the vibration sensor 3 can also function as the main sensor for the detection of the vehicle collision, and the pressure sensor 2 can function as the safetying sensor with respect to the vibration sensor 3 to restrict the false detection of the vehicle detection. That is, the vehicle collision can be detected based on a main determination according to the vibration of the vehicle (e.g., inner panel 51) which is detected by the vibration sensor 3, and a safetying determination according to the pressure in the space 53 which is detected by the pressure sensor 2.

In the above-described embodiments, the substantially-closed space 53 is arranged in the door 5 of the vehicle. However, the vehicle can be also provided with the substantially-closed space 53 at the periphery portion thereof other than the door 5, so that the vehicle collision such as a head-on collision can be detected.

In the above-described embodiments, both the pressure sensor 2 and the vibration sensor 3 are mounted to the space-side surface of the inner panel 51. That is, the pressure sensor 2 and the vibration sensor 3 are arranged in the space 53. However, the vibration sensor 3 can be also arranged outside the space 53, at a position where the vibration transferred to the pressure sensor 2 can be detected. For example, the vibration sensor 3 can be opposite to the pressure sensor 2 with the inner panel 51 interposed therebetween. In this case, the pressure sensor 2 and the vibration sensor 3 are respectively mounted to the opposite surfaces of the inner panel 51.

Such changes and modifications are to be understood as being in the scope of the present invention as defined by the appended claims.

What is claimed is:

1. A collision detecting system for a vehicle, comprising:
   a pressure detecting member for detecting a pressure in a substantially closed space which is arranged at a periphery portion of the vehicle; and
   a vibration detecting member for detecting a vibration of the vehicle, wherein
   the pressure in the space is calculated for a detection of a collision of the vehicle, based on pressure signals detected by the pressure detecting member and vibration signals detected by the vibration detecting member, and by subtracting the vibration signals detected by the vibration detecting member from the pressure signals detected by the pressure detecting member.

2. The collision detecting system according to claim 1, wherein the pressure detecting member and the vibration detecting member are positioned in contact with each other.

3. The collision detecting system according to claim 2, wherein:
   the pressure detecting member has a first sensing unit which senses the pressure in the space;
   the vibration detecting member has a second sensing unit which senses the vibration of the vehicle; and
   the first sensing unit and the second sensing unit are stacked in a detection direction of the pressure detecting member.

4. The collision detecting system according to claim 3, wherein the vibration detecting member is constructed of a pressure sensor.

5. The collision detecting system according to claim 3, wherein the vibration detecting member is constructed of an acceleration sensor.

6. The collision detecting system according to claim 3, wherein
   one of the pressure detecting member and the vibration detecting member constructs a main sensor and the other constructs a safetying sensor, for the detection of the collision of the vehicle.

7. The collision detecting system according to claim 1, further comprising
   a calculating unit for calculating the pressure in the space based on the pressure signals from the pressure detecting member and the vibration signals from the vibration detecting member.

8. The collision detecting system according to claim 1, wherein the space is arranged in a door of the vehicle.

9. The collision detecting system according to claim 1, further comprising
   a passenger protecting device for protecting a passenger in the vehicle when the collision of the vehicle is detected according to the pressure signals from the pressure detecting member and the vibration signals from the vibration detecting member.

10. The collision detecting system according to claim 1, wherein the vibration detecting member is arranged in the space.

11. The collision detecting system according to claim 1, wherein the pressure detecting member is arranged in the space.

12. The collision detecting system according to claim 2, wherein the first sensing unit of the pressure detecting member and the second sensing unit of the vibration detecting member are integrated with each other.

13. The collision detecting system according to claim 8, wherein the pressure detecting member and the vibration detecting member are mounted to the door of the vehicle.

14. A collision detecting system for a vehicle, comprising:
   a pressure detecting member for detecting a pressure in a substantially closed space which is arranged at a periphery portion of the vehicle; and
   a vibration detecting member for detecting a vibration of the vehicle, wherein
   the pressure in the space is calculated for a detection of a collision of the vehicle, based on pressure signals detected by the pressure detecting member and vibration signals detected by the vibration detecting member;
   the pressure detecting member and the vibration detecting member are positioned in contact with each other;
   the pressure detecting member has a first sensing unit which senses the pressure in the space;

the vibration detecting member has a second sensing unit which senses the vibration of the vehicle;

the first sensing unit and the second sensing unit are stacked in a detection direction of the pressure detecting member; and one of the pressure detecting member and the vibration detecting member constructs a main sensor and the other constructs a safetying sensor, for the detection of the collision of the vehicle.

15. A collision detecting system for a vehicle, comprising:

a pressure detecting member for detecting a pressure in a substantially closed space which is arranged at a periphery portion of the vehicle;

a vibration detecting member for detecting a vibration of the vehicle, wherein the pressure in the space is calculated for a detection of a collision of the vehicle, based on pressure signals detected by the pressure detecting member and vibration signals detected by the vibration detecting member; and a passenger protecting device for protecting a passenger in the vehicle when the collision of the vehicle is detected according to the pressure signals from the pressure detecting member and the vibration signals from the vibration detecting member.

\* \* \* \* \*